Figure 1:
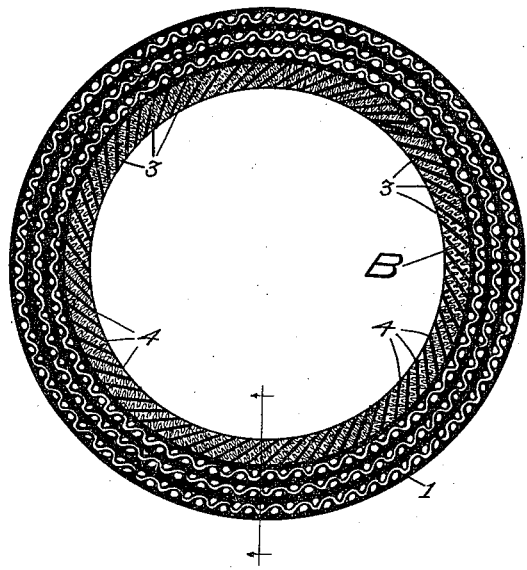

W. F. BOWERS.
FLUID HOSE.
APPLICATION FILED JULY 6, 1915.

1,179,692.

Patented Apr. 18, 1916.

WITNESS

INVENTOR
William F. Bowers
BY
Acker & Totten
his ATTORNEYS

UNITED STATES PATENT OFFICE.

WILLIAM F. BOWERS, OF SAN FRANCISCO, CALIFORNIA.

FLUID-HOSE.

1,179,692.  Specification of Letters Patent.  Patented Apr. 18, 1916.

Application filed July 6, 1915. Serial No. 38,291.

*To all whom it may concern:*

Be it known that I, WILLIAM F. BOWERS, a citizen of the United States, residing at the city and county of San Francisco and State of California, have invented certain new and useful Improvements in Fluid-Hose, of which the following is a specification.

The hereinafter described invention relates to an improved hose for the conveying of oil, gasolene or other fluids and which may be employed for use as a flexible coupling for sections of dredger pipes, and the object of the invention is to provide an interior surface lining for the conduit (which conduit is composed usually of rubber and textile fabric) of such construction that the frictional wear shall fall onto the edges of the fabric of the inner lining instead of on the horizontal face surface thereof, and by so doing materially increasing the life and effectiveness of the conduit as a medium for the conveying of fluid and as a flexible coupling joint or union for the adjacent end of pipe sections of a dredger pipe line. Usually, the inner liner of a composite hose is composed of either a layer of rubber or a woven ring of textile fabric united to the rubber of the composite hose, consequently, during the flow of liquid or material therethrough all frictional wear falls onto the horizontal surface or face of the material constituting the inner lining and the same quickly becomes worn through, and in the use of a rubber lining the same not only wears, but scales, flakes and peels from the body of the hose. The resisting or friction resisting qualities of material is many times greater when exposed edgewise to the material flowing thereover, than when the flat surface thereof is exposed to the wear action, and where the liner or interior lining surface is a built-up one composed of layers or strips of textile fabric set edgewise to the horizontal surface of the conduit, hose or coupling, and united one to the other by a cementing medium, such, for instance, as rubber, the fiber of the textile fabric will be so disposed as to present or afford an end contact to the material flowing therethrough, not only increasing the friction wear resistance, but equally so materially strengthening the construction of the hose, conduit or coupling.

Broadly stated, the invention consists in providing a hose, conduit or flexible coupling, preferably one wherein one or more layers of textile fabric is employed and embedded within a rubber cementing medium, with an interior lining or friction wear surface composed of longitudinal layers of textile fabric, preferably cut on the bias, a cementing medium uniting the layers one to the other, and the said layers so united being disposed within the hose so as to present the edge of the layers of textile fabric to the action of the material flowing through the hose or conduit, the friction wear lining being united to the hose structure by a cementing medium.

In the carrying out of the improved method of constructing the hose, conduit or flexible tubular coupling, the body thereof consisting of horizontal layers of rubber and textile fabric is formed, and the inner wear lining therefor constructed or built-up of longitudinal disposed layers of textile fabric set edgewise and preferably cut on the bias and separated one from the other by layers of a cementing medium in the form of dough rubber. The crude or unfinished wear lining and equally so the body member of the hose, conduit or flexible tubular coupling is subjected to pressure to force the cementing medium or dough rubber into and through the interstices of the layers of textile fabric, the parts so constructed being then, by means of a suitable forming mandrel, formed into a tubular cylindrical structure, the inner built-up friction wear lining having its textile layers disposed edgewise to the horizontal surface thereof and the parts then united one to the other by the usual vulcanizing process. After the forming and vulcanization of the parts there is produced a hose, conduit or flexible tubular coupling, the body portion of which comprises horizontally disposed layers of textile fabric and rubber and the inner wear lining a series of united longitudinal layers of textile fabric vertically disposed relative to the horizontal surface thereof in order to expose to the action of material flowing through the pipe or conduit the edges of the fabric composing the textile layers of the inner wear lining.

Inasmuch as a flexible coupling for the ends of adjacent pipe sections of a dredger pipe line merely comprises a short tubular section, the term tubular structure as hereinafter used is employed to designate such a structure and likewise to include any form of a flexible composite conduit, in other words, said expression is to be understood as meaning and including generally a flexible composite conduit employed for use in connection with the transporting of fluids and through which material is passed.

To fully comprehend the invention, reference should be had to the accompanying sheet of drawings, wherein—

Figure 2:
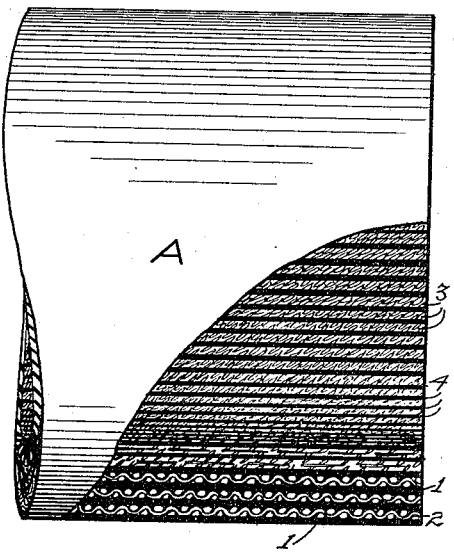
Figure 3:
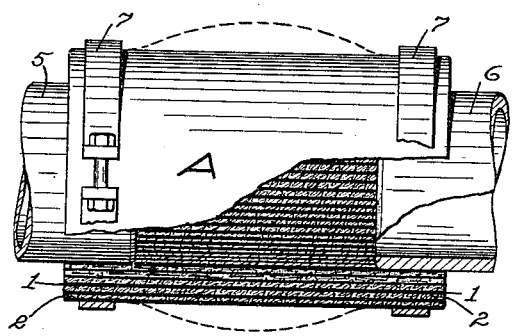
Figure 4:
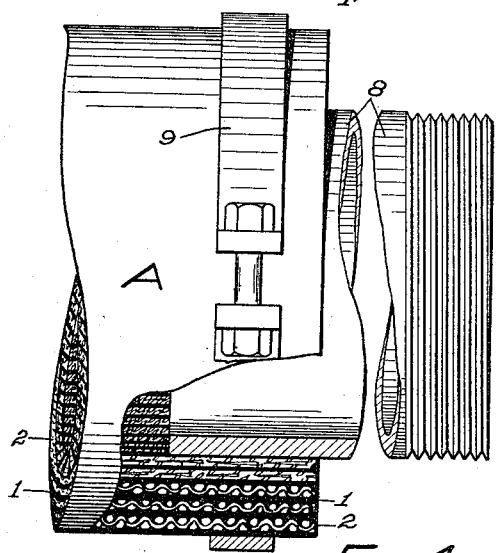
Figure 5:
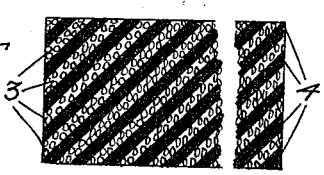

Figure 1 is an end view of the improved hose. Fig. 2 is a detail side elevation of the hose with its body partly broken away and part sectioned in order to illustrate the disposition of the inner friction wear lining. Fig. 3 is a broken side elevation illustrating the hose as employed as a coupling joint for uniting the ends of adjacent pipe sections. Fig. 4 is a detail broken part sectional view of hose with an ordinary metallic coupling member applied to one end thereof. Fig. 5 is an enlarged broken detail end elevation of the inner friction lining removed from the hose, illustrating the arrangement of the layers of textile fabric composing the said lining.

In the drawings, the numeral 1 is used to designate the horizontally disposed rubber layers and 2 the horizontally disposed layers of textile fabric embedded therein, and which said layers of rubber and textile fabric constitute the body A proper of the composite hose, which parts are united and formed into a tubular structure in any well known manner.

Within the tubular structure or hose body there is secured by vulcanization an inner friction wear lining B, which is composed of a series of longitudinally disposed parallel layers or strips 3 of textile fabric, which fabric is preferably cut on the bias, and arranged edgewise to the horizontal surface thereof and of the layers constituting the body portion of the hose or tubular structure. The face of each layer 3 of the friction wear lining B is separated from an adjacent layer by a cementing medium 4 composed preferably of rubber and which serves, when the parts 3 and 4 are secured one to the other, to firmly unite the textile layers and form the built-up friction wear lining B for the tubular structure. Preferably, the longitudinally disposed textile layers 3 of the friction lining are cut on the bias and set obliquely relative to each other or at a transverse inclination to the horizontal surface thereof, so that the face of each obliquely disposed layer 3 overlaps the opposing face of an adjacent layer. Inasmuch as the fibers of the layers 3 of the textile fabric are set diagonally relative to each other (due to the fact that the material is cut on the bias) the said layers when so cut, positioned and united one to the other, form an inner wear lining B for the tubular structure, and one wherein each layer of the liner will stand at a transverse inclination to the horizontal surface of the body of the tubular structure and be permitted free expansion for the layers 3 longitudinally and transversely, so that the wear lining expands free in all directions and all friction wear of the material passing through the tubular structure falls wholly upon the ends of the fibers of the layers 3.

By arranging the longitudinally disposed parallel layers 3 of the inner wear lining at an inclination to the horizontal surface of the body of the tubular structure and the face of one layer overlapping the opposing face of an adjacent layer, the said layers, when the members constituting the inner liner are united and secured to and within the tubular structure by vulcanization, are interlocked one with the other and the assembled layers 3 of the inner wear lining give in unison to the longitudinal and transverse expansion of the body member of the said tubular structure; consequently, the contraction, expansion and buckling of the tubular structure during the use thereof and the passing of fluids and material therethrough under pressure has not the effect of tearing apart or separating the said united layers 3 of the inner wear lining.

In Fig. 3 of the drawings, the tubular structure is illustrated as connected to the ends of adjacent pipe sections 5 and 6 by the clamp rings 7, serving in such case as a flexible coupling for the sections of a dredger pipe line, and by dotted lines in said Fig. 3 is illustrated the expansion of the tubular structure, due to the pressure of the material passing therethrough. In Fig. 4 of the drawings the tubular structure is illustrated as having a metallic coupling member 8 within the end thereof and clamped thereto by the coupling ring 9. By reference to said views—Figs. 3 and 4 of the drawings, it will be noted that the ends of the metallic pipe sections 5 and 6 and the inner end portion of the coupling member 8 bear onto the inclined edge surfaces of the layers 3 of the inner liner, which under the twisting, turning or bending of the tubular structure do not bite into the material which gives freely thereto, with the result that the tubular structure at such point is not cut away and broken, as is the case where the ends of the metallic pipe sections 5 and 6 and of the coupling member 8 act against the usual horizontal surface of the structure. By thus constructing the inner wear liner for the tubular structure of a series of built-up longitudinally disposed layers of textile fabric set edgewise or substantially vertical to the horizontal surface and preferably at an inclination thereto, the tubular structure is not only materially strengthened and a greater resistance to frictional wear presented, but the cutting, tearing away or puncturing of the tubular structure at the point of the ends of the pipe sections or coupling member fitted therein, which at present takes place by reason of the metal gradually biting into the inner wall surface of the structure during the twisting, turning and binding thereof is obviated, thus dispensing with the outer or exterior strengthening pieces at present employed to reinforce the tubular structure at such points, and more especially so in connection with the large size tubular structure constructed for and utilized as a flexible conduit for oil, gasolene and similar fluids forced therethrough under pressure.

As stated, the preferred method of manufacturing the improved tubular structure is to form the body thereof of dough rubber having one or more horizontal layers of textile fabric embedded therein, apply to the inner face thereof the partially formed friction wear liner, consisting of longitudinally disposed parallel layers of textile fabric set edgewise to the horizontal surface (preferably cut on the bias), separated by layers of dough rubber, placing the members thus formed within a suitable mandrel for constructing therefrom a cylindrical structure, and finally uniting the whole by subjecting the same to the usual vulcanization of the dough rubber, which serves as the cementing medium for the textile layers of the tubular structure, so that when the parts are properly united there is produced a composite flexible tubular structure having an interior wear liner consisting of longitudinally disposed parallel layers of textile fabric set or arranged edgewise to the horizontal surface thereof, the edgewise disposed layers of textile fabric of the liner being preferably set at an inclination to the horizontal in order that the faces of adjacent layers will overlap.

Having thus described the invention what is claimed as new and desired to be protected by Letters Patent is:—

1. As a new article of manufacture, an inner cylindrical wear liner for tubular structures, the same comprising a series of parallel layers of textile material set edgewise to the surface thereof and united by a cementing medium so that the faces of adjacent layers overlap.

2. An article of manufacture, a composite tubular structure comprising a body member formed of rubber having a horizontally disposed layer of fabric embedded therein, an inner wear member or liner secured within the said body member and consisting of a series of longitudinally disposed layers of textile fabric cut on the bias set at a transverse inclination to the horizontal surface of the body member and united one to the other so that the face of adjacent layers overlap, the members composing the tubular structure being united one to the other by vulcanization of the rubber portions thereof.

3. An article of manufacture, a composite tubular structure comprising a body member and an inner wear member or liner secured within the structure to form an integral portion thereof, the said body member comprising rubber having a plurality of layers of horizontally disposed textile fabric embedded therein, the wear member or liner consisting of a series of longitudinally disposed parallel layers of textile fabric cut on the bias set at a transverse inclination to the horizontal surface of the body member and united one to the other by rubber interposed therebetween so that the faces of adjacent layers overlap, the said wear member united to the body member to constitute an integral portion of the tubular structure.

4. As an article of manufacture, a tubular structure having as an integral part and applied to the inner face thereof a wearing member which constitutes the inner wearing surface of the structure, the same comprising a series of longitudinally disposed layers of textile fabric cut on the bias set at a transverse inclination relative to the horizontal surface of the inner face of the structure and united one to the other so that the face of adjacent members overlap, the said layers being united one to the other by rubber interposed between the faces thereof and vulcanized.

5. As a new article of manufacture, an inner cylindrical wear liner for tubular structures, the same comprising a series of parallel layers of textile material set edgewise to the surface thereof and united by a cementing medium, so that the faces of adjacent layers overlap.

In testimony whereof I have signed my name to this specification in the presence of two subscribing witnesses.

WILLIAM F. BOWERS.

Witnesses:
HARRY A. TOTTEN,
D. B. RICHARDS.

Copies of this patent may be obtained for five cents each, by addressing the "Commissioner of Patents, Washington, D. C."